(12) United States Patent
La Civita et al.

(10) Patent No.: US 9,196,165 B2
(45) Date of Patent: Nov. 24, 2015

(54) ASSESSING FEASIBILITY OF AN AIRCRAFT TRAJECTORY

(71) Applicant: The Boeing Company, Chicago, IL (US)

(72) Inventors: Marco La Civita, Madrid (ES); Miguel Vilaplana, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/551,622

(22) Filed: Nov. 24, 2014

(65) Prior Publication Data

US 2015/0170523 A1   Jun. 18, 2015

(30) Foreign Application Priority Data

Dec. 18, 2013   (EP) ..................................... 13382526

(51) Int. Cl.
*G08G 5/00* (2006.01)
*G05D 1/00* (2006.01)
(Continued)

(52) U.S. Cl.
CPC ............. *G08G 5/003* (2013.01); *G01C 21/20* (2013.01); *G05D 1/0005* (2013.01);
(Continued)

(58) Field of Classification Search
CPC ....... G08G 5/00; G08G 5/003; G08G 5/0039; G08G 5/0047; G05D 1/00; G05D 1/0212; G05D 1/0214; G05D 1/0217; G05D 1/04; G05D 1/0808; G05D 1/0825; G05D 1/10; G05D 1/101

USPC .................... 701/3–18, 23–27, 120–122, 400
See application file for complete search history.

(56) References Cited

U.S. PATENT DOCUMENTS 7,277,043 B2 * 10/2007 Arthur et al. .................... 342/29
8,332,084 B1 * 12/2012 Bailey et al. .................... 701/10
(Continued)

FOREIGN PATENT DOCUMENTS

EP     2040137     3/2009
EP     2503530     9/2012
(Continued)

OTHER PUBLICATIONS

European Search Report and Opinion, European Application No. 13382526.5 (Jun. 6, 2014).
(Continued)

*Primary Examiner* — Thomas Tarcza
*Assistant Examiner* — Tyler J Lee
(74) *Attorney, Agent, or Firm* — Baldwin Quan

(57) ABSTRACT

The present disclosure relates to a method of assessing the feasibility of a desired four-dimensional trajectory to be flown by an aircraft. The method comprises converting a description of the desired trajectory into a kinematic description of aircraft intent that corresponds to the desired trajectory, and providing a trajectory computation engine with the kinematic description of aircraft intent, aircraft performance data that describes the performance of the aircraft and atmospheric data that describes the atmospheric conditions along the desired trajectory, and using the trajectory computation engine to attempt to calculate the desired trajectory from the kinematic description of aircraft intent, the aircraft performance data and the atmospheric data, and reporting whether or not the desired trajectory was calculated.

20 Claims, 4 Drawing Sheets

(51) Int. Cl.
    *G05D 1/02*  (2006.01)
    *G01C 21/20* (2006.01)
    *G05D 1/10*  (2006.01)

(52) U.S. Cl.
    CPC ............. *G05D 1/0212* (2013.01); *G05D 1/101* (2013.01); *G08G 5/0013* (2013.01); *G08G 5/0039* (2013.01); *G08G 5/0082* (2013.01); *G08G 5/0091* (2013.01); *G08G 5/0095* (2013.01)

(56) References Cited

U.S. PATENT DOCUMENTS

| | | | |
|---|---|---|---|
| 8,818,576 B2* | 8/2014 | Maldonado et al. | 701/4 |
| 8,818,696 B2* | 8/2014 | Klooster et al. | 701/120 |
| 9,020,662 B2* | 4/2015 | Felix et al. | 701/3 |
| 2006/0069497 A1  | 3/2006 | Wilson | 701/120 |
| 2010/0305781 A1* | 12/2010 | Felix | 701/3 |
| 2012/0083946 A1* | 4/2012 | Maldonado et al. | 701/3 |
| 2012/0158219 A1* | 6/2012 | Durling et al. | 701/4 |
| 2012/0158280 A1 | 6/2012 | Ravenscroft | |
| 2012/0191333 A1* | 7/2012 | Sawhill et al. | 701/122 |
| 2012/0245834 A1* | 9/2012 | Klooster et al. | 701/120 |
| 2013/0054055 A1* | 2/2013 | Mathews et al. | 701/3 |
| 2014/0277853 A1* | 9/2014 | Castillo-Effen et al. | 701/3 |

FOREIGN PATENT DOCUMENTS

| | | |
|---|---|---|
| EP | 2667275 | 11/2013 |
| WO | 2013/082657 | 6/2013 |

OTHER PUBLICATIONS

Besada, J.A. et al., "Automated Aircraft Trajectory Prediction Based on Formal Intent-Related Language Processing," IEEE Transactions on Intelligent Transportation Systems, vol. 14, No. 2, pp. 1067-1082 (Sep. 2013).

Bronsvoort, J. et al., "Model for a Combined Air-Ground Approach to Closed-Loop Trajectory Prediction in Support of Trajectory Management," AIAA Modeling and Simulation Technologies Conference, vol. 2, pp. 791-806 (Aug. 19-22, 2013).

Dupuy, M. et al., "Preliminary Results for a Robust Trajectory Prediction Method Using Advanced Flight Data," 26th Digital Avionics Systems Conference (Oct. 21, 2007).

* cited by examiner

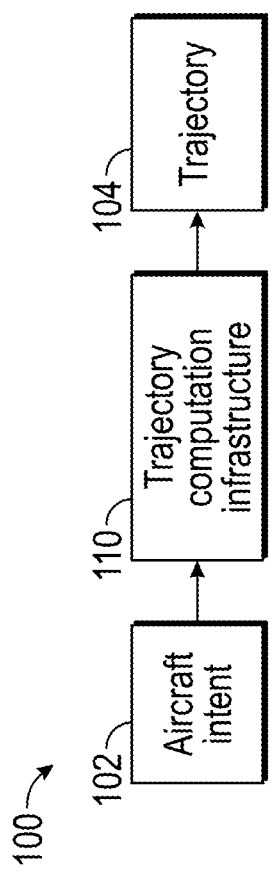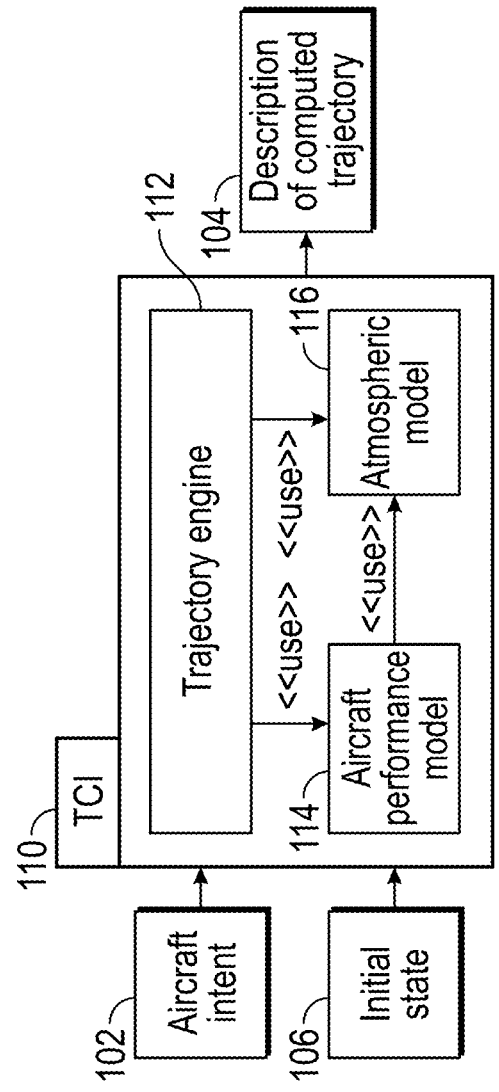

| Time | Altitude | Longitude | Latitude | Ground Speed |
|---|---|---|---|---|
| | | | | |
| 256 | 24150 | 56.2541 | 45.0055 | 205 |
| 257 | 24150 | 56.2550 | 45.0053 | 205 |
| 258 | 24150 | 56.2559 | 45.0050 | 205 |
| 259 | 24150 | 56.2569 | 45.0048 | 205 |

FIG. 3

| Time | Geometric Altitude | Ground Speed | Geometric Bearing |
|---|---|---|---|
| | | | |
| 128 | 22000 | 200 | 85.5 |
| 129 | 22000 | 200 | 85.5 |
| 130 | 22000 | 200 | 85.5 |
| 131 | 22000 | 200 | 85.5 |

FIG. 4

ASSESSING FEASIBILITY OF AN AIRCRAFT TRAJECTORY

CROSS REFERENCE TO RELATED APPLICATIONS

This application claims the benefit of EP Patent Application No. 13382526.5 entitled Assessing Feasibility of an Aircraft Trajectory, filed on Dec. 18, 2013 in the Spanish Patent Office, the disclosure of which is incorporated herein by reference in its entirety.

FIELD OF THE DISCLOSURE

The present disclosure relates to assessing the feasibility of a four-dimensional trajectory to be flown by an aircraft.

BACKGROUND TO THE DISCLOSURE

Knowledge of an aircraft's trajectory, whether planned or already executed, is useful for a number of reasons. By trajectory, an unambiguous four-dimensional description of the aircraft's path is meant. The trajectory description may be the evolution of the aircraft's state with time, where the state may include the position of the aircraft (e.g. the position of the aircraft's center of mass) and, optionally, the evolution of other aspects of the aircraft's motion such as velocity, attitude and weight. Thus, the trajectory may be represented as an indication of each of these typical aircraft states at consecutive points in time during the flight. For example, the trajectory may be represented as a sequence of geometric altitudes, ground speeds and geometric bearing angles at successive points in time in the evolution of the trajectory.

Methods exist that allow aircraft trajectories to be calculated from aircraft intent. Aircraft intent is a description of how the aircraft is to be flown. For example, the aircraft intent is expressed as instructions using a formal language. The description provides a complete description of the aircraft's behavior such that all degrees of freedom of motion are defined and a unique trajectory may be calculated unambiguously from the description. The trajectory may be calculated using a trajectory computation infrastructure that, in addition to the aircraft intent data, uses a description of the aircraft performance and a description of the atmospheric conditions as further inputs. European Patent Application No. EP-A-2040137, also in the name of The Boeing Company, describes aircraft intent and trajectory computation in more detail, and the disclosure of this application is incorporated herein in its entirety by reference.

Aircraft intent allows an aircraft's trajectory to be predicted unambiguously by solving a set of differential equations that model both aircraft behavior and atmospheric conditions. The aircraft intent may be derived from flight intent, as follows. Flight intent may be thought of as a generalization of the concept of a flight plan, and reflects operational constraints and objectives such as intended or required route and operator preferences. Generally, flight intent may not unambiguously define an aircraft's trajectory, as the information it contains need not close all degrees of freedom of the aircraft's motion. Put another way, there are likely to be many aircraft trajectories that would satisfy a given flight intent. Thus, flight intent may be regarded as a basic blueprint for a flight, but lacks the specific details required to compute unambiguously a trajectory.

For example, the instructions to be followed during a standard terminal arrival route (STAR) or a standard instrument departure (SID) would correspond to an example of flight intent. In addition, airline preferences may also form an example of flight intent. To determine aircraft intent, instances of flight intent like a SID procedure, the airline's operational preferences and the actual pilot's decision making process are combined. This is because the aircraft intent comprises a structured set of instructions that are used by a trajectory computation infrastructure to provide an unambiguous trajectory. The instructions should include configuration details of the aircraft (e.g. landing gear deployment), and procedures to be followed during maneuvers and normal flight (e.g. track a certain turn radius or hold a given airspeed). These instructions capture the basic commands and guidance modes at the disposal of the pilot and the aircraft's flight management system to direct the operation of the aircraft. Thus, aircraft intent may be thought of as an abstraction of the way in which an aircraft is commanded to behave by the pilot and/or flight management system.

Aircraft intent is expressed using a set of parameters presented so as to allow equations of motion to be solved. These parameters may be ground-referenced parameters, air-referenced parameters, or a combination of both. Aircraft intent may be expressed as a full operational aircraft intent that defines completely how the aircraft is to be operated. As an alternative, the aircraft intent may be expressed as a kinematic aircraft intent in which instructions relating to the required kinematics for following a trajectory are specified (for example, to specify the three dimensional position and speed that the aircraft should follow). The theory of formal languages may be used to implement these formulations of aircraft intent: an aircraft intent description language provides the set of instructions and the rules that govern the allowable combinations that express the aircraft intent, and so allow a prediction of the aircraft trajectory.

Also, it is possible to take a description of an aircraft trajectory and calculate a corresponding operational aircraft intent. However, there may be more than one operational aircraft intent that would give rise to an aircraft trajectory.

Aircraft intent is especially useful in planning flights and missions of aircraft. Expressing aircraft intent using formal languages provides a common platform for the exchange of flight information and allows different interested parties to perform trajectory calculations.

There exist reasons why it would be advantageous to determine if an aircraft trajectory is feasible. For example, an aircraft trajectory may be described in ground referenced parameters. A check may be required to ensure that it may be flown in the current atmospheric conditions. Alternatively, the trajectory may have been calculated using previously existing atmospheric conditions, and a check is required that the same trajectory remains feasible in the current atmospheric conditions.

As another example, a specific trajectory may have been calculated for a particular aircraft type and a check is required to confirm that the specific trajectory is feasible for another aircraft type. The other aircraft may be, for example, an aircraft with lesser performance and/or agility.

A third example arises where a change in the trajectory is required. This could arise in air traffic management (ATM). Air traffic management is responsible for the safe separation of aircraft. This may be a particularly demanding task especially in congested airspaces, such as around airports. ATM decision-support tools based on accurate trajectory descriptions could allow a greater volume of aircraft to be handled while maintaining safety. It has been proposed for aircraft to file desired trajectories, for example by filing descriptions of aircraft intent. ATM should be able to compare the trajectories to determine conflicts, to amend the desired trajectories to resolve conflicts, and to inform affected aircraft of the changes to their trajectories. Then changes may be made to the desired trajectories by ATM without regard to the aircraft's performance. In this case, either the ATM or the aircraft (or both) should determine whether or not it is feasible for the aircraft to fly the amended trajectory.

SUMMARY OF THE DISCLOSURE

In one aspect, the present disclosure resides in a computer-implemented method of assessing the feasibility of a desired four-dimensional trajectory to be flown by an aircraft. The method comprises obtaining a description of the desired four-dimensional trajectory. The method further comprises obtaining performance data from an aircraft performance model that describes the performance of the aircraft. The method comprises obtaining atmospheric data from an atmospheric model that describes the atmospheric conditions along the desired trajectory. The method also comprises converting the description of the desired trajectory into a kinematic description of aircraft intent that corresponds to the desired trajectory. Finally, the method includes providing a trajectory computation engine with the kinematic description of aircraft intent, the performance data and the atmospheric data, and using the trajectory computation engine to attempt to calculate the desired trajectory from the kinematic description of aircraft intent, the performance data and the atmospheric data, and reporting whether or not the desired trajectory was calculated.

In another embodiment, a system for assessing the feasibility of a desired four-dimensional trajectory to be flown by an aircraft is disclosed. The system comprises a computer, a trajectory computation engine, and a memory for a computer program that when executed causes the computer to obtain a description of the desired four-dimensional trajectory. The computer program also causes the computer to obtain performance data from an aircraft performance model that describes the performance of the aircraft. The computer program also causes the computer to obtain atmospheric data from an atmospheric model that describes the atmospheric conditions along the desired trajectory. The computer program also causes the computer to convert the description of the desired trajectory into a kinematic description of aircraft intent that corresponds to the desired trajectory. The computer program also causes the computer to provide the trajectory computation engine with the kinematic description of aircraft intent, the performance data and the atmospheric data, and use the trajectory computation engine to attempt to calculate the desired trajectory from the kinematic description of aircraft intent, the performance data and the atmospheric data. Finally, the computer program also causes the computer to report whether or not the desired trajectory was calculated.

In yet another embodiment, a non-transitory computer readable medium for assessing the feasibility of a desired four-dimensional trajectory to be flown by an aircraft is disclosed. The computer readable medium comprises a computer program that when executed by a computer, causes the computer to obtain a description of the desired four-dimensional trajectory. The computer program also causes the computer to obtain performance data from an aircraft performance model that describes the performance of the aircraft. The computer program also causes the computer to obtain atmospheric data from an atmospheric model that describes the atmospheric conditions along the desired trajectory. The computer program also causes the computer to convert the description of the desired trajectory into a kinematic description of aircraft intent that corresponds to the desired trajectory. The computer program also causes the computer to provide to a trajectory computation engine, the kinematic description of aircraft intent, the performance data and the atmospheric data, and use the trajectory computation engine to attempt to calculate the desired trajectory from the kinematic description of aircraft intent, the performance data and the atmospheric data. Finally, the computer program also causes the computer to report whether or not the desired trajectory was calculated.

BRIEF DESCRIPTION OF THE DRAWINGS

In order that the present disclosure may be more readily understood, preferred embodiments will now be described, by way of example only, with reference to the accompanying drawings in which:

FIG. 1 shows an example of a system for computing an aircraft's trajectory using flight intent and aircraft intent;

FIG. 2 shows the example system of FIG. 1 in greater detail;

FIG. 3 shows an example of a description of an aircraft trajectory;

FIG. 4 shows an example of the description of the aircraft trajectory of FIG. 3 converted into a description of the aircraft trajectory expressed as geometric altitude, ground speed and geometric bearing;

DETAILED DESCRIPTION

Figure 5:
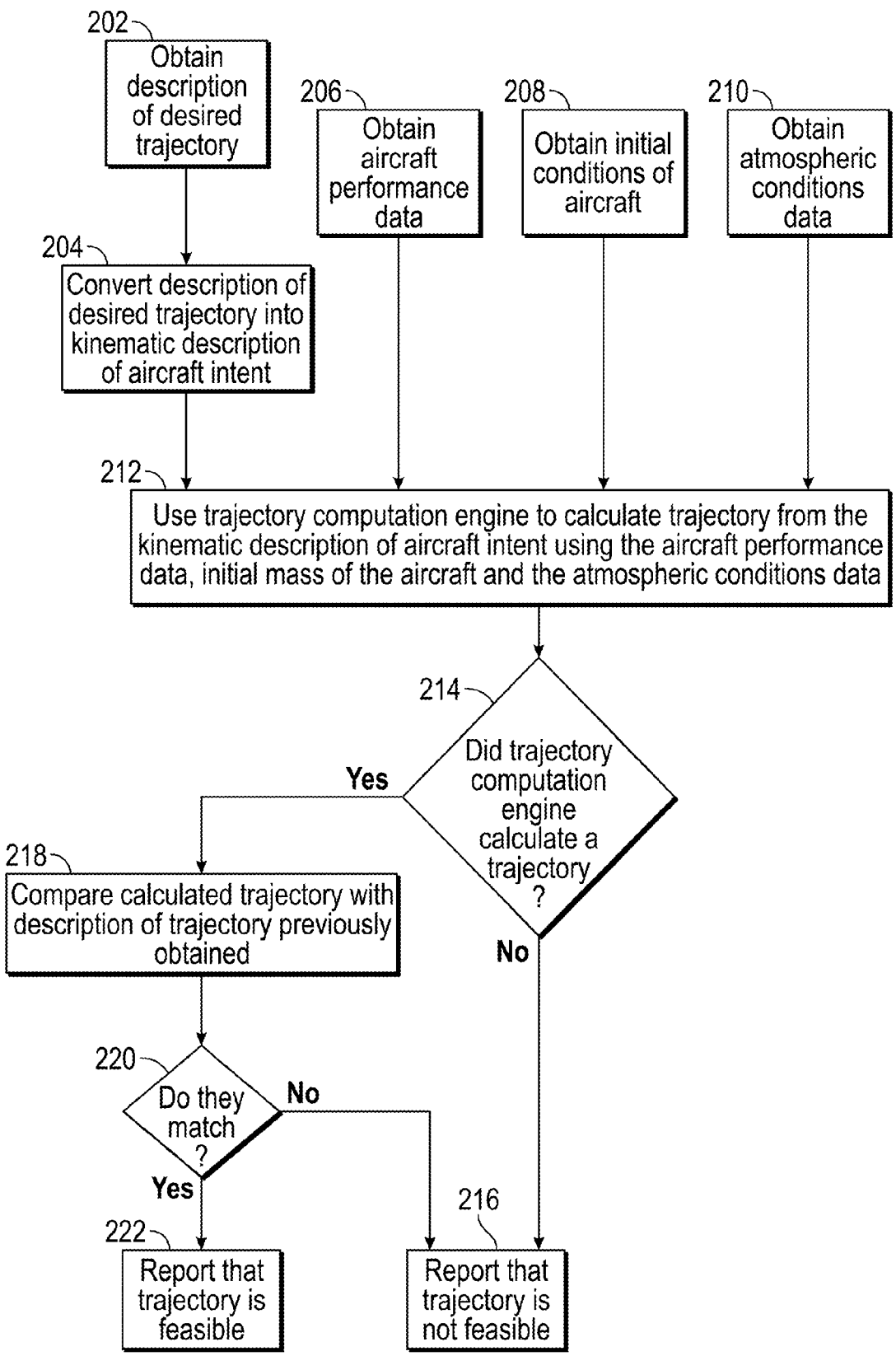
FIG. 5 is a schematic representation of a method of assessing the feasibility of an aircraft trajectory according to a first embodiment of the present disclosure.

In one aspect, the present disclosure resides in a computer-implemented method of assessing the feasibility of a desired four-dimensional trajectory to be flown by an aircraft. The method comprises obtaining a description of the desired four-dimensional trajectory. This may comprise retrieving the description or may comprise receiving the description. Alternatively, it may comprise generating the description of the desired trajectory, for example based upon a mission plan.

The method further comprises obtaining performance data from an aircraft performance model that describes the performance of the aircraft. For example, the method may comprise obtaining the aircraft type such as a model name or number and retrieving the relevant performance data for that type. The aircraft type may be retrieved from the description of the desired trajectory, or it may be obtained from elsewhere.

The method also comprises obtaining atmospheric data from an atmospheric model that describes the atmospheric conditions along the desired trajectory. The method may comprise determining the time that the desired trajectory is to be flown, and obtaining the atmospheric conditions predicted to exist in the region of the trajectory at that time.

The method further comprises obtaining the description of the desired trajectory into a kinematic description of aircraft intent that corresponds to the desired trajectory.

The method also comprises providing a trajectory computation engine with the kinematic description of aircraft intent, the performance data and the atmospheric data, and using the trajectory computation engine to attempt to calculate the desired trajectory from the kinematic description of aircraft intent, the performance data and the atmospheric data, and reporting whether or not the desired trajectory was calculated.

The method may further comprise obtaining the initial mass of the aircraft along with the step of providing the trajectory computation engine with the initial mass of the aircraft. The method also includes using the trajectory computation engine to attempt to calculate the desired trajectory from the kinematic description of aircraft intent, the performance data, the atmospheric data and the initial mass of the aircraft, and reporting whether or not the desired trajectory was calculated.

Optionally, the method comprises using the trajectory computation engine to attempt to calculate a computed four-dimensional trajectory. The method also includes comparing the computed trajectory with the desired trajectory to determine whether or not the desired trajectory was calculated. If it proves impossible to calculate any computed trajectory, the method may comprise reporting this. Optionally, the reason why it was not possible to calculate a trajectory may be reported. For example, the method may comprise reporting which part or parts of the trajectory could not be computed. The method may comprise reporting which parts of the flight envelope reached or exceeded their limits and hence prevented the trajectory from being computed.

The method may comprise if the desired trajectory was not calculated, reporting why it was not possible to calculate the desired trajectory. Optionally, the reason why it was not possible to calculate the desired trajectory may be reported. For example, the method may comprise reporting which part or parts of the desired trajectory were not matched. The method may comprise reporting which parts of the flight envelope reached or exceeded their limits and hence prevented the desired trajectory from being matched.

In one embodiment, converting the description of the desired trajectory into the kinematic description of aircraft intent may comprise converting the description into a series of kinematic instructions that close all degrees of freedom of the aircraft during the trajectory. The series of kinematic instructions may comprise three time series of instructions closing three degrees of freedom of motion. The three series may correspond to one of lateral motion, one of vertical motion and one of propulsion.

Converting the description of the desired trajectory into a description of kinematic aircraft intent that corresponds to the desired trajectory may comprise converting the description of the desired trajectory into a time sequence of geometric altitudes, ground speeds and geometric bearing angles. Then, the method may further comprise converting the time sequence of geometric altitudes, ground speeds and geometric bearing angles into three time sequences of aircraft intent instructions relating to geometric altitudes, ground speeds and geometric bearing angles.

Optionally, using the kinematic description of aircraft intent to attempt to calculate a trajectory may comprise converting the kinematic description of aircraft intent into an operational description of aircraft intent. The operational description of aircraft intent may include instructions to define all degrees of freedom, for example three degrees of freedom of motion and three degrees of freedom of configuration of the aircraft. The three degrees of motion may be lateral motion, vertical motion and propulsion. The three degrees of aircraft configuration may be high lift devices, airbrakes and landing gear. The operational aircraft intent may be derived by a trajectory computation engine using the kinematic aircraft intent, the atmospheric data and the performance data.

Deriving the operational aircraft intent may comprise the following steps: generating candidate aircraft intents, forming a cost function for each candidate aircraft intent having a cost function score, evolving the candidate aircraft intents using an evolutionary algorithm that optimizes the cost function scores, and providing a description of the aircraft intent with the best cost function score. Generating candidate aircraft intents may be done randomly or may be done based to some extent on the desired trajectory. The cost function may provide a figure of merit for the aircraft intent, for example to reflect how well the candidate aircraft intent would match the desired trajectory. The candidate aircraft intents may be evolved through any number of iterations. The iterations may terminate in any well know way, for example by a test for convergence. The method may comprise forming a multivariate cost function that is optimised by the evolutionary algorithm.

Turning now to FIGS. 1 and 2, a computer system 100 for computing an aircraft's trajectory is shown.

FIG. 1 shows how aircraft intent 102 may be used to derive a description of an aircraft's trajectory 104. In essence, aircraft intent 102 is provided as an input to a trajectory computation infrastructure 110. The trajectory computation infrastructure 110 calculates an unambiguous trajectory 104 using the aircraft intent 102 and other inputs that are required to solve equations of motion of the aircraft. The trajectory computation infrastructure 110 may be air-based or land-based. For example, the trajectory computation infrastructure 110 may be associated with an aircraft's flight management system that controls the aircraft on the basis of a predicted trajectory that captures the airline operating preferences and business objectives. A land-based trajectory computation infrastructure 110 may be located at an air traffic control facility or a mission planning facility.

FIG. 2 shows the system of FIG. 1 in further detail. As can be seen, FIG. 2 shows that the trajectory computation infrastructure 110 comprises a trajectory engine 112. The trajectory engine 112 requires as inputs both the aircraft intent description 102 mentioned above and also the initial state 106 of the aircraft. The initial state 106 of the aircraft may be defined as part of the aircraft intent 102 in which case these two inputs are effectively one and the same.

In a preferred embodiment, the description of aircraft intent 102 is expressed using a formal language. The aircraft intent 102 may correspond to a set of instructions comprising configuration instructions that describe the aerodynamic configuration of the aircraft and motion instructions that describe the motion of the aircraft. The set of instructions comply with a set of rules to ensure that the configuration instructions define the aerodynamic configuration of the aircraft and that the motion instructions close the degrees of freedom of equations of motion used to describe the aircraft motion. Thus, the aircraft intent 102 is an expression of a set of instructions in a formal language, an aircraft intent description language, which defines unambiguously the trajectory 104 of the aircraft. This expression is used by the trajectory engine 112 to solve the equations of motion that govern the aircraft's motion and thereby produce the resulting trajectory 104.

There exists in the art many different sets of equations of motion that describe an aircraft's motion. The sets of equations generally differ due to their complexity. In principle, any of these sets of equations may be used by the trajectory engine 112. The actual form of the equations of motion influences how the aircraft intent description language should be formulated because variables that appear in the equations of motion also appear in the instructions defining the aircraft intent 102.

The set of equations of motion may describe the motion of the aircraft's center of gravity, with the aircraft considered as a mass-varying rigid solid. Three coordinates may describe the position of the aircraft's center of mass (longitude, latitude and altitude) and three values describe the aircraft's attitude (roll, pitch and yaw). To derive the equations, a set of simplifying assumptions may be applied to the general equations describing atmospheric, powered flight.

The equations of motion will include variables relating to the aircraft's performance and meteorological conditions, and these are provided by the aircraft performance model 114 and the atmospheric model 116, which are described below. To solve the equations, the configuration of the aircraft should be specified. For example, information may be required to resolve the settings of the landing gear, speed brakes and high lift devices.

The aircraft intent description language is a formal language whose primitives are the instructions. The grammar of the formal language provides the framework that allows instructions to be combined into sentences that describe operations. Each operation contains a complete set of instructions that close the required six degrees of freedom in the equations of motion and so unambiguously defines the aircraft trajectory 104 over its associated operation interval. The instructions may be thought of as indivisible pieces of information that capture basic commands, guidance modes and control inputs at the disposal of the pilot and/or the flight management system.

For the trajectory engine 112 to provide a description of the computed trajectory 104 for the aircraft, the trajectory engine 112 uses two models: an aircraft performance model 114 and an atmospheric model 116.

The aircraft performance model 114 provides the values of the aircraft performance aspects required by the trajectory engine 112 to integrate the equations of motion. These values depend on the aircraft type for which the trajectory is being computed, the aircraft's current motion state (position, velocity, weight, etc.) and the current local atmospheric conditions.

In addition, the performance values may depend on the intended operation of the aircraft, i.e. on the aircraft intent 102. For example, a trajectory engine 112 may use the aircraft performance model 114 to provide a value of the instantaneous rate of descent corresponding to a certain aircraft weight, atmospheric conditions (pressure altitude and temperature) and intended speed schedule (e.g. constant calibrated airspeed). The trajectory engine 112 may also request from the aircraft performance model 114 the values of the applicable limitations so as to ensure that the aircraft motion remains within the flight envelope. The aircraft performance model 114 is also responsible for providing the trajectory engine 112 with other performance-related aspects that are intrinsic to the aircraft, such as flap and landing gear deployment times.

The atmospheric model 116 provides atmospheric conditions data relating to environmental conditions, such as the state of the atmosphere, weather conditions, gravity and magnetic variation.

The trajectory engine 112 uses the inputs (i.e. the aircraft intent 102 and initial state 106), the aircraft performance model 114 and the atmospheric model 116 to solve a set of equations of motion. The trajectory engine 112 outputs a description of the unambiguous aircraft trajectory 104. This may be done in a number of ways. For example, the trajectory engine 112 may provide a graphical representation of the trajectory 104, such as a display of the flight path presented on one or more maps to indicate lateral and longitudinal positions with time. Of more interest to the present disclosure is a non-graphical provision of a description of the aircraft trajectory 104. For example, textual and numerical data may be provided to describe the aircraft trajectory 104, e.g. the time evolution of the flight path. This may be done in a tabular form.

FIG. 3 shows an example of a tabular description of a four-dimensional trajectory 104. In this example, the trajectory 104 is defined by the altitude, longitude, latitude and ground speed at each of a series of time points. As will be appreciated, all of these parameters are defined with reference to the ground. The units used to express each of the parameters are not critical.

With the above explained as background, embodiments of the present disclosure will now be explained.

FIG. 5 shows a method in accordance with an embodiment of the present disclosure. At step 202, a description of a proposed four-dimensional trajectory 104a is obtained. The description may correspond to a tabulated description like that shown in FIG. 3.

At step 204, a computer converts the description of the proposed trajectory 104a into a kinematic description of aircraft intent. This description may contain instructions defined using ground-referenced parameters or air-referenced parameters.

At step 206, aircraft performance data relating to the aircraft is obtained, and at step 208 the initial conditions of the aircraft are obtained. This may correspond to just the initial mass of the aircraft. At step 210, atmospheric data describing the atmospheric conditions that will be encountered while flying the proposed trajectory 104a are retrieved.

Next, at step 212, the trajectory computation engine 112 (seen in FIG. 2) is used to calculate a trajectory. The trajectory computation engine 112 converts the kinematic description of aircraft intent into an operational description of aircraft intent that corresponds to the proposed trajectory 104a. This is done using the aircraft performance data retrieved at step 206, the initial conditions of the aircraft retrieved at step 208, and the atmospheric data retrieved at step 210. For example, the kinematic description of aircraft intent may be converted into a sequence of operational aircraft intent instructions including targets and constraints that, when followed, would result in the aircraft following the proposed trajectory 104a. Further details of this step are provided below.

Concurrently, the trajectory computation engine 112 solves the differential equations governing the flight of the aircraft to produce a computed four-dimensional trajectory 104b. This is as has previously been described. If the proposed trajectory 104a is feasible, the trajectory computation engine 112 will produce a matching computed trajectory 104b.

As indicated by the conditional box shown at 214 in FIG. 5, how the method progresses depends upon whether or not the trajectory computation engine 112 managed to calculate a computed trajectory 104b. If a computed trajectory 104b was not calculated, the trajectory computation infrastructure 110 provides a report at 216 to confirm that a trajectory 104b could not be computed and hence that the proposed trajectory 104a is not feasible. Alternatively, if the trajectory computation engine 112 computed a trajectory 104b, at 218 the trajectory computation infrastructure 110 compares the computed trajectory 104b calculated at step 212 with the proposed trajectory 104a obtained at step 202 to check that they match as indicated at 220. If the trajectories 104a and 104b match, it is indicative that the proposed trajectory 104a is feasible. So, the trajectory computation infrastructure 110 reports that the proposed trajectory 104a is feasible at step 222. If the trajectories 104a and 104b do not match, it is indicative of either an error or that the proposed trajectory 104a is not feasible. In this embodiment, the trajectory computation infrastructure 110 merely reports that the proposed trajectory 104a is not feasible, as indicated at step 216.

Figure 6:
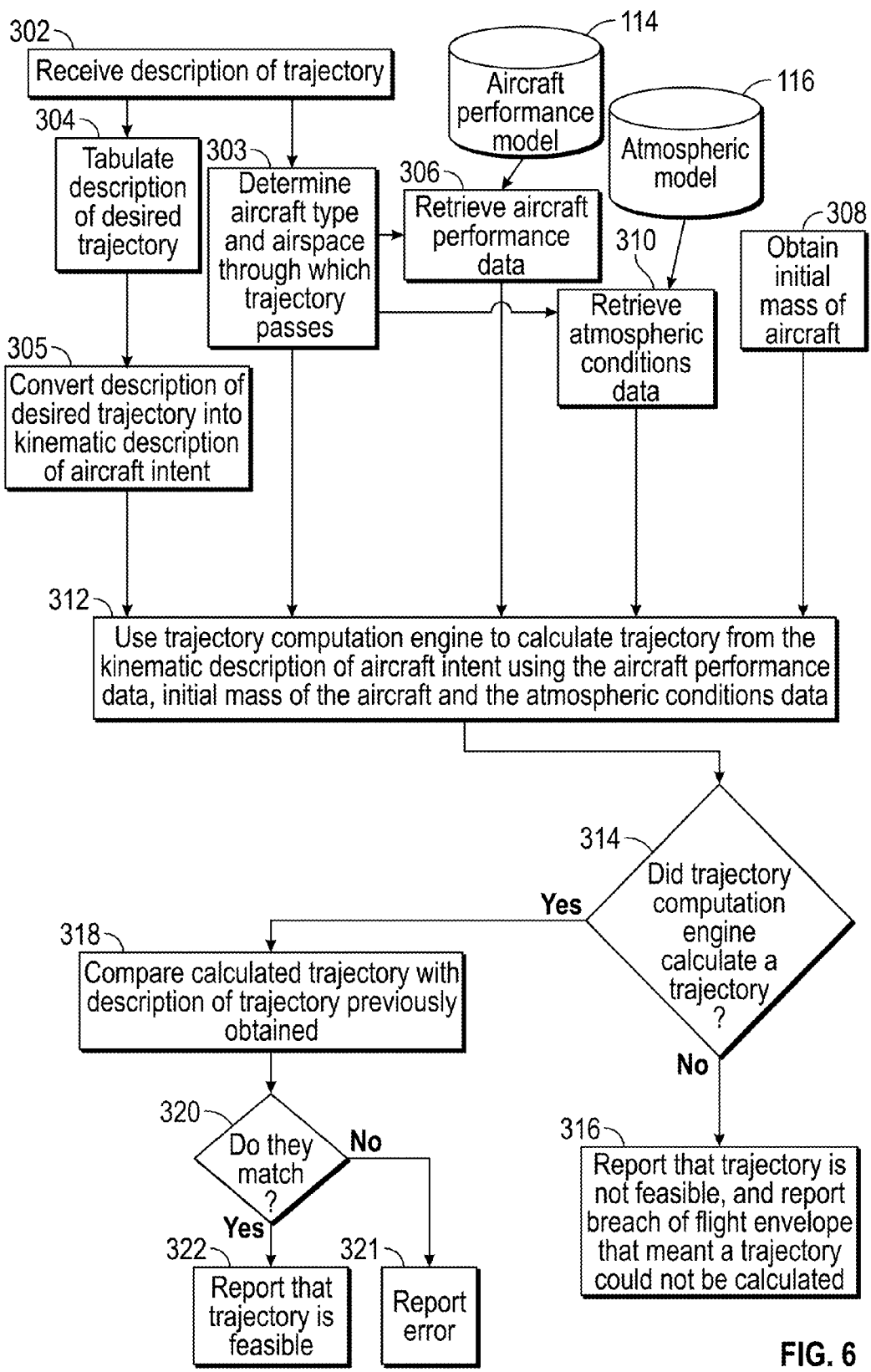
FIG. 6 is a schematic representation of a method of assessing the feasibility of an aircraft trajectory according to a second embodiment of the present disclosure.

FIG. 6 shows a further embodiment of the present disclosure. Many features shown in FIG. 6 were previously described with reference to FIG. 5, and so the following description focuses on the new features and elements.

The method of FIG. 6 starts at step 302 where the trajectory computation infrastructure 110 (FIGS. 1 and 2) receives a description of a proposed four-dimensional trajectory 104a. The trajectory computation infrastructure 110 performs two operations on the description 104a. Step 304 sees the description of the proposed trajectory 104a converted into a tabular form, and step 303 sees the trajectory computation infrastructure 110 identify the aircraft type and relevant airspace from the description 104a. These two steps will now be described in turn.

At step 304, the description received at step 302 may be converted into a tabular description of the desired trajectory expressed using ground-referenced parameters. For example, the trajectory computation infrastructure 110 extracts or calculates a time sequence of geometric altitudes, ground speeds and geometric bearing angles corresponding to the time intervals of the description of the proposed trajectory 104a obtained at step 302. The tabulated description of FIG. 3 may be converted into the form shown in FIG. 4. Conversion of quantities like altitude, longitude, latitude and ground speed into geometric altitude, ground speed and geometric bearing will be straightforward to one of ordinary skill in the art, and so will not be described in further detail here. This converted tabulated description of the desired trajectory 104a is used to generate the kinematic description of aircraft intent at step 305. This is performed as has already been described with respect to step 204 of FIG. 5.

In parallel, at step 303, the trajectory computation infrastructure 110 locates an aircraft identifier contained within the description of the proposed trajectory 104a received at 302 to determine the aircraft type. Alternatively, this information may be obtained in other ways. For example, the information may be sent separately. With the aircraft type identified, the trajectory computation infrastructure 110 retrieves aircraft performance data pertaining to that aircraft type from the aircraft performance model database 114, as indicated at 306.

Also at step 303, the trajectory computation infrastructure 110 determines the airspace through which the proposed trajectory 104a extends and, at step 310, retrieves atmospheric conditions data relating to that airspace from the atmospheric model database 116. Advantageously, the trajectory computation infrastructure 110 determines the proposed time of the flight from the description of the proposed trajectory 104a and obtains the atmospheric conditions data predicted to apply to the airspace at the proposed time of the flight.

At step 308, the trajectory computation infrastructure 110 obtains the initial mass of the aircraft. This may be provided within the description of the proposed trajectory 104a or it may be provided separately.

The information obtained at steps 305, 303, 306, 308 and 310 is used at step 312 to calculate a trajectory. The kinematic description of aircraft intent is converted into an operational description of aircraft intent. That is, the sequence of kinematic instructions generated at step 305 are converted into three sequences of operational aircraft intent instructions, where each sequence may include targets and constraints for one of geometric altitudes, ground speeds and geometric bearing angles. As explained above, the operational aircraft intent instructions must close all degrees of freedom of the aircraft. In this embodiment, the operational aircraft intent instructions define three degrees of aircraft motion (e.g. altitude, lateral motion and speed) and three degrees of aircraft configuration (e.g. landing gear, speed brakes and lift devices).

In more detail, at step 312, the trajectory computation infrastructure 110 uses the kinematic description of aircraft intent produced at step 305, the aircraft performance model data retrieved at step 306 and the atmospheric data retrieved at step 310 to generate an operational description of aircraft intent, that is data describing an operational aircraft intent that would result in the aircraft flying the desired trajectory 104a.

It is to be remembered that while a particular aircraft intent will result in a unique trajectory 104, any particular trajectory 104 will not necessarily have a corresponding unique operational aircraft intent. That is to say, a particular trajectory 104 may be the result of flying any of multiple different aircraft intents 102. Therefore, the operational aircraft intent description produced at step 305 may not be unique.

In some applications, the desired trajectory 104a may have been produced from an original description of aircraft intent. If so, the description of aircraft intent generated at step 305 may not necessarily match that original description. For many applications, this will not be material. For example, the trajectory 104a flown by the aircraft may be what matters, and how the aircraft is operated to fly that trajectory 104a is not so important. This is particularly true as by trajectory 104a, a four-dimensional description of the flight path is meant such that the aircraft intent description generated at step 305 will still ensure that the aircraft follows the desired flight path while also ensuring the aircraft reaches each point on the flight path at the desired time.

In other applications, it may be desirable for the aircraft intent description generated at step 305 to be the same as the original aircraft intent, or to be as similar to that original aircraft intent data as possible. Such an approach is possible. For example, methods to do this are described in European Patent Application No. 12382273.6, also in the name of The Boeing Company, and incorporated herein in its entirety by reference.

Essentially, this disclosure describes generating candidate aircraft intents that may produce the required trajectory (based on aircraft performance data and atmospheric conditions data), forming cost functions for the candidate aircraft intents and performing a multi-objective cost function optimization to produce a selection of candidate aircraft intents with the lowest cost functions. In this context, the candidate aircraft intent with the lowest cost function value may be selected as the operational aircraft intent description provided at step 305, and it should correspond well with the original aircraft intent.

At step 312, in addition to generating the operational aircraft intent description, the trajectory computation engine 112 solves the equations of motion governing the aircraft to produce a computed trajectory 104b. This will be possible provided the aircraft has the performance necessary to execute the required flight path to follow the proposed trajectory 104a in the prevailing weather conditions. Should this not be the case, the trajectory computation engine 112 can indicate the part or parts of the proposed trajectory 104a that cannot be performed and also indicate which part of the flight envelope would be breached (e.g. too great a rate of climb or too high bank angle).

So, as described before with respect to FIG. 5, the method proceeds depending upon whether or not a computed trajectory 104b was produced by the trajectory computation engine 112, as indicated at 314. If a trajectory 104b is not computed, the trajectory computation infrastructure 110 reports that the proposed trajectory 104a received at step 302 is not feasible, and indicates which parts of the proposed trajectory 104a are not feasible and why.

If a trajectory 104b is computed, the comparison with the proposed trajectory 104a received at step 302 is made at step 318. If as determined at step 320, the computed trajectory 104b produced at step 312 does not match the proposed trajectory 104a received at step 302, the trajectory computation infrastructure 110 reports an error at step 321. If the match is successful, as determined at step 320, the trajectory computation infrastructure 110 reports that the proposed trajectory 104a is feasible at step 322.

Those skilled in the art will appreciate that variations may be made to the above embodiments without departing from the scope of the disclosure that is defined by the appended claims.

The desired trajectory 104a may be described in terms of ground referenced parameters. Alternatively, the desired trajectory 104a may be described in a mixture of ground referenced and air referenced parameters. For example, the position of the aircraft may be described using ground referenced parameters like longitude, latitude and altitude whereas the speed may be expressed as an airspeed. In addition, the desired aircraft trajectory 104a may be expressed purely in terms of air referenced parameters. In such a case, the description will most likely have been generated with reference to atmospheric data obtained from an atmospheric model 116 and aircraft performance data obtained from an aircraft performance model 114. Knowledge of those atmospheric data and aircraft performance data allows the air referenced description to be converted into a ground referenced description of the desired trajectory 104a, such that the method may then proceed as described above.

Further, embodiments of the methods disclosed may include a computer programmed to operate in accordance with the methods described herein. The computer may be air-based or land-based. For example, an air-based computer may be associated with an aircraft's flight management system that controls the aircraft on the basis of a predicted trajectory that captures the airline operating preferences and business objectives. In another example, a land-based computer system may be located at an air traffic control facility or a mission planning facility. The computer may include a memory for a computer program, that when executed causes the computer to operate in accordance with the methods described herein. The computer program may also be embodied in a computer readable medium having the computer program stored therein.

The invention claimed is:

1. A computer-implemented method of assessing the feasibility of a desired four-dimensional trajectory to be flown by an aircraft, comprising:
   obtaining a description of the desired four-dimensional trajectory;
   obtaining performance data from an aircraft performance model that describes the performance of the aircraft;
   obtaining atmospheric data from an atmospheric model that describes the atmospheric conditions along the desired trajectory;
   converting the description of the desired trajectory into a kinematic description of aircraft intent that corresponds to the desired trajectory; and
   providing a trajectory computation engine with the kinematic description of aircraft intent, the performance data and the atmospheric data, and using the trajectory computation engine to attempt to calculate the desired trajectory from the kinematic description of aircraft intent, the performance data and the atmospheric data, and reporting whether or not the desired trajectory was calculated.

2. The method of claim 1, further comprising obtaining an initial mass of the aircraft and wherein providing a trajectory computation engine comprises providing the initial mass of the aircraft to the trajectory computation engine, and using the trajectory computation engine to attempt to calculate the desired trajectory from the kinematic description of aircraft intent, the performance data, the atmospheric data and the initial mass of the aircraft, and reporting whether or not the desired trajectory was calculated.

3. The method of claim 1, wherein providing a trajectory computation engine comprises using the trajectory computation engine to attempt to calculate a computed four-dimensional trajectory, and comparing the computed trajectory with the desired trajectory to determine whether or not the desired trajectory was calculated.

4. The method of claim 1, further comprising, if the desired trajectory was not calculated, reporting why it was not possible to calculate the desired trajectory.

5. The method of claim 4, wherein reporting why it was not possible to calculate the desired trajectory comprises reporting what part of a flight envelope is exceeded.

6. The method of claim 1, wherein converting the description of the desired trajectory into the kinematic description of aircraft intent that corresponds to the desired trajectory comprises converting the description of the desired trajectory into a time sequence of geometric altitudes, ground speeds and geometric bearing angles.

7. The method of claim 6, wherein using the trajectory computation engine further comprises converting the time sequence of geometric altitudes, ground speeds and geometric bearing angles into three time sequences of aircraft intent instructions relating to geometric altitudes, ground speeds and geometric bearing angles.

8. The method of claim 1, wherein attempting to calculate a trajectory that corresponds to the desired trajectory comprises converting the kinematic description of aircraft intent into an operational description of aircraft intent, by:
   generating candidate aircraft intents;
   forming a cost function for each candidate aircraft intent having a cost function score;
   evolving the candidate aircraft intents using an evolutionary algorithm that optimizes the cost function scores; and
   providing a description of the aircraft intent with the best cost function score.

9. A system for assessing the feasibility of a desired four-dimensional trajectory to be flown by an aircraft, the system comprising a computer, a trajectory computation engine, and a memory for a computer program that when executed causes the computer to:
   obtain a description of the desired four-dimensional trajectory;
   obtain performance data from an aircraft performance model that describes the performance of the aircraft;
   obtain atmospheric data from an atmospheric model that describes the atmospheric conditions along the desired trajectory;
   convert the description of the desired trajectory into a kinematic description of aircraft intent that corresponds to the desired trajectory; and
   provide the trajectory computation engine with the kinematic description of aircraft intent, the performance data and the atmospheric data, and use the trajectory computation engine to attempt to calculate the desired trajectory from the kinematic description of aircraft intent, the performance data and the atmospheric data; and report whether or not the desired trajectory was calculated.

10. The system of claim 9, wherein the computer is further caused to obtain an initial mass of the aircraft and provide the initial mass of the aircraft to the trajectory computation engine, and use the trajectory computation engine to attempt to calculate the desired trajectory from the kinematic description of aircraft intent, the performance data, the atmospheric data and the initial mass of the aircraft, and report whether or not the desired trajectory was calculated.

11. The system of claim 9, wherein the computer is further caused to use the trajectory computation engine to attempt to calculate a computed four-dimensional trajectory, and compare the computed trajectory with the desired trajectory to determine whether or not the desired trajectory was calculated.

12. The system of claim 9, wherein the computer is further caused to, if the desired trajectory was not calculated, report why it was not possible to calculate the desired trajectory.

13. The system of claim 12, wherein reporting why it was not possible to calculate the desired trajectory comprises reporting what part of a flight envelope is exceeded.

14. The system of claim 9, wherein converting the description of the desired trajectory into the kinematic description of aircraft intent that corresponds to the desired trajectory comprises converting the description of the desired trajectory into a time sequence of geometric altitudes, ground speeds and geometric bearing angles.

15. The system of claim 14, wherein using the trajectory computation engine by the computer further comprises converting the time sequence of geometric altitudes, ground speeds and geometric bearing angles into three time sequences of aircraft intent instructions relating to geometric altitudes, ground speeds and geometric bearing angles.

16. The system of claim 9, wherein using the trajectory engine to attempt to calculate a trajectory that corresponds to the desired trajectory comprises using the trajectory engine to convert the kinematic description of aircraft intent into an operational description of aircraft intent, by:

generating candidate aircraft intents;

forming a cost function for each candidate aircraft intent having a cost function score;

evolving the candidate aircraft intents using an evolutionary algorithm that optimises the cost function scores; and providing a description of the aircraft intent with the best cost function score.

17. A non-transitory computer readable medium for assessing the feasibility of a desired four-dimensional trajectory to be flown by an aircraft, the computer readable medium comprising a computer program that when executed by a computer, causes the computer to:

obtain a description of the desired four-dimensional trajectory;

obtain performance data from an aircraft performance model that describes the performance of the aircraft;

obtain atmospheric data from an atmospheric model that describes the atmospheric conditions along the desired trajectory;

convert the description of the desired trajectory into a kinematic description of aircraft intent that corresponds to the desired trajectory; and provide to a trajectory computation engine, the kinematic description of aircraft intent, the performance data and the atmospheric data, and use the trajectory computation engine to attempt to calculate the desired trajectory from the kinematic description of aircraft intent, the performance data and the atmospheric data; and report whether or not the desired trajectory was calculated.

18. The computer readable medium of claim 17, wherein the computer is further caused to obtain an initial mass of the aircraft and provide the initial mass of the aircraft to the trajectory computation engine, and use the trajectory computation engine to attempt to calculate the desired trajectory from the kinematic description of aircraft intent, the performance data, the atmospheric data and the initial mass of the aircraft, and report whether or not the desired trajectory was calculated.

19. The computer readable medium of claim 17, wherein the computer is further caused to use the trajectory computation engine to attempt to calculate a computed four-dimensional trajectory, and compare the computed trajectory with the desired trajectory to determine whether or not the desired trajectory was calculated.

20. The computer readable medium of claim 17, wherein the computer is further caused to, if the desired trajectory was not calculated, report why it was not possible to calculate the desired trajectory.

* * * * *